(12) United States Patent
Funami

(10) Patent No.: US 6,368,168 B1
(45) Date of Patent: Apr. 9, 2002

(54) TILT DEVICE FOR MARINE PROPULSION UNIT

(75) Inventor: Yasuo Funami, Saitama (JP)

(73) Assignee: Showa Corporation (JP)

( * ) Notice: Subject to any disclaimer, the term of this patent is extended or adjusted under 35 U.S.C. 154(b) by 0 days.

(21) Appl. No.: 09/693,528

(22) Filed: Oct. 20, 2000

(30) Foreign Application Priority Data

Jan. 18, 2000 (JP) .................................... 2000-009500

(51) Int. Cl.[7] ............................................... B63H 5/125
(52) U.S. Cl. ........................................................ 440/61
(58) Field of Search ................................................ 440/61

(56) References Cited

U.S. PATENT DOCUMENTS

| | | | | |
|---|---|---|---|---|
| 5,053,634 A | * | 10/1991 | Kakinuma | 440/61 |
| 5,529,519 A | * | 6/1996 | Nakamura et al. | 440/61 |
| 6,048,235 A | * | 4/2000 | Kai | 440/61 |

FOREIGN PATENT DOCUMENTS

JP          1021307          8/1998

* cited by examiner

*Primary Examiner*—Stephen Avila
(74) *Attorney, Agent, or Firm*—Orum & Roth

(57) ABSTRACT

To provide a trim-tilt device for a marine propulsion unit in which an armored case of a motor is made of resin and a circulating passage of a hydraulic fluid, which is circulated by a pump, is arranged in the inside of the motor.

15 Claims, 6 Drawing Sheets

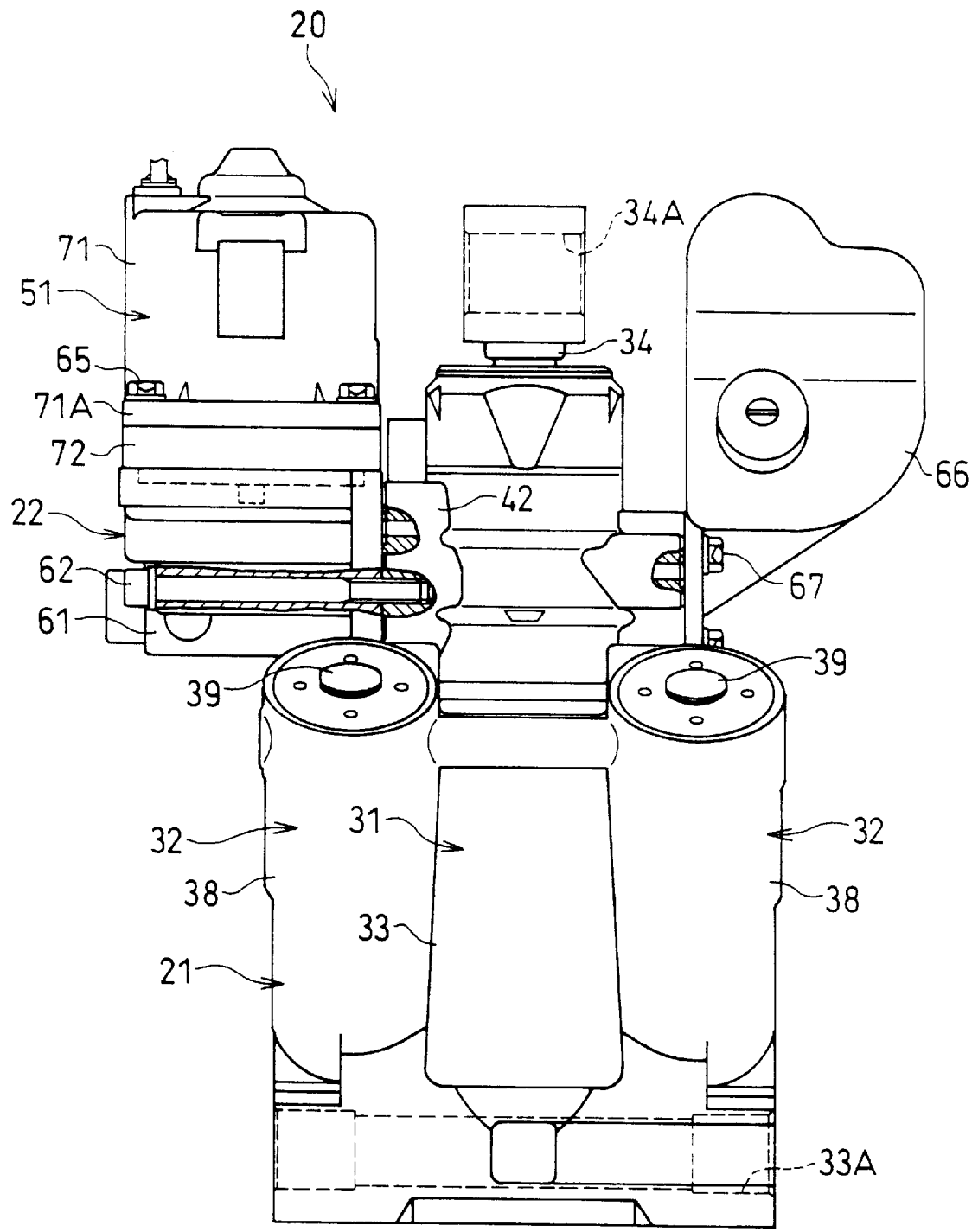
F I G. 2

F I G. 7
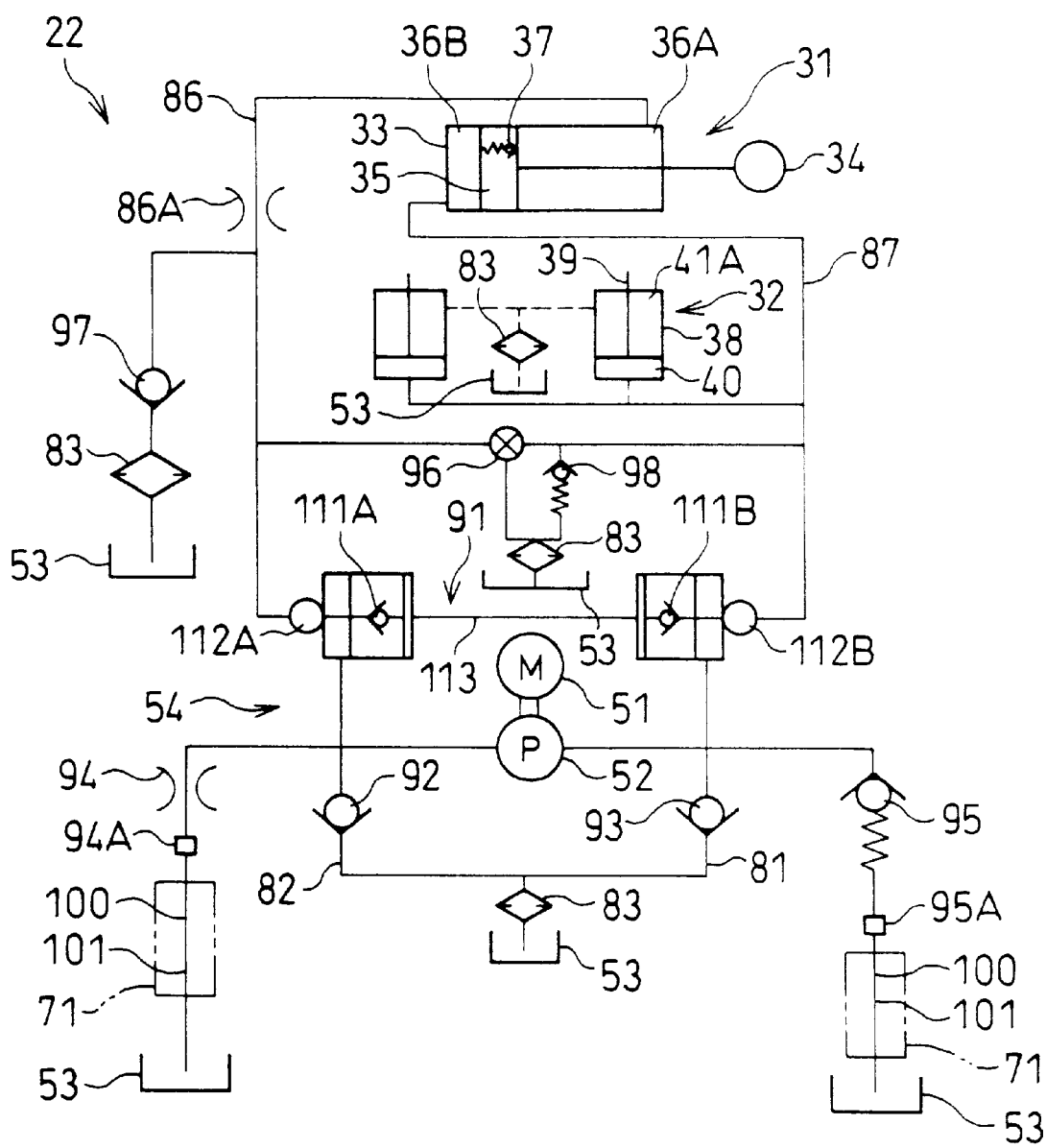

TILT DEVICE FOR MARINE PROPULSION UNIT

BACKGROUND OF THE INVENTION

1. Field of the Invention

The present invention relates to a tilt device for a marine propulsion unit.

2. Description of the Related Art

Conventionally, as a tilt device for a marine propulsion unit, there has been suggested a trim-tilt device for a marine propulsion unit comprising a cylinder device interposed between a boat body and a marine propulsion unit. It is tiltably supported with respect to the boat body and a hydraulic fluid supply/discharge device for extending and contracting the cylinder device and tilt operating the a marine propulsion unit by controlling supply and discharge of the hydraulic fluid to the cylinder device. The hydraulic fluid supply/discharge device comprises a motor, a pump, a tank and a flowing passage with a switching valve.

There is a conventional art such that an armored case of a motor made from resin is used as a substitute for an armored case made of deep-draw mold iron intending to reduce the production cost of the motor and improve corrosive resistance.

However, the conventional art using a resin made armored case of the motor involves the following problems.

(1) Since seawater or the like submerges a motor of the marine propulsion unit, the motor has a water-resistant airtight construction. Therefore, if an armored case of the motor is made of resin, the resin made case having low heat conductivity acts as a heat-retaining member, so that hot air is easily accumulated in the interior of the motor.

(2) According to (1), the interior of the motor reaches a high temperature. As a result, a winding wire of an armature is bum out and an abnormal friction of a brush or the like occurs, so that the durability and the life of the motor are shorten.

SUMMARY OF THE INVENTION

The object of the invention is to prevent heat accumulation in the inside of a resin made motor composing a tilt device for a marine propulsion unit and to improve the durability and the life of the motor.

The present invention provides a tilt device for a marine propulsion unit comprising a cylinder device interposed between a boat body and a marine propulsion unit, which is tiltably supported with respect to the boat body. It also has a hydraulic fluid supply/discharge device for extending and contracting the cylinder device and tilt operating a marine propulsion unit by controlling the supply and discharge of the hydraulic fluid to the cylinder device. The hydraulic fluid supply/discharge device comprises a motor, a pump, a tank and a flowing passage with a switching valve. An armored case of the motor is made of resin and a circulating passage of the hydraulic fluid to be circulated by the pump is arranged in the inside of the motor.

BRIEF DESCRIPTION OF THE DRAWINGS

The present invention will be more filly understood from the detailed description given below and from the accompanying drawings which should not be taken to be a limitation on the invention, but are for explanation and understanding only.

The drawings

FIG. 2 is a front view of a tilt-trim device;

FIG. 7 is a hydraulic circuit of a tilt-trim device.

DESCRIPTION OF THE PREFERRED EMBODIMENTS

Figure 1:
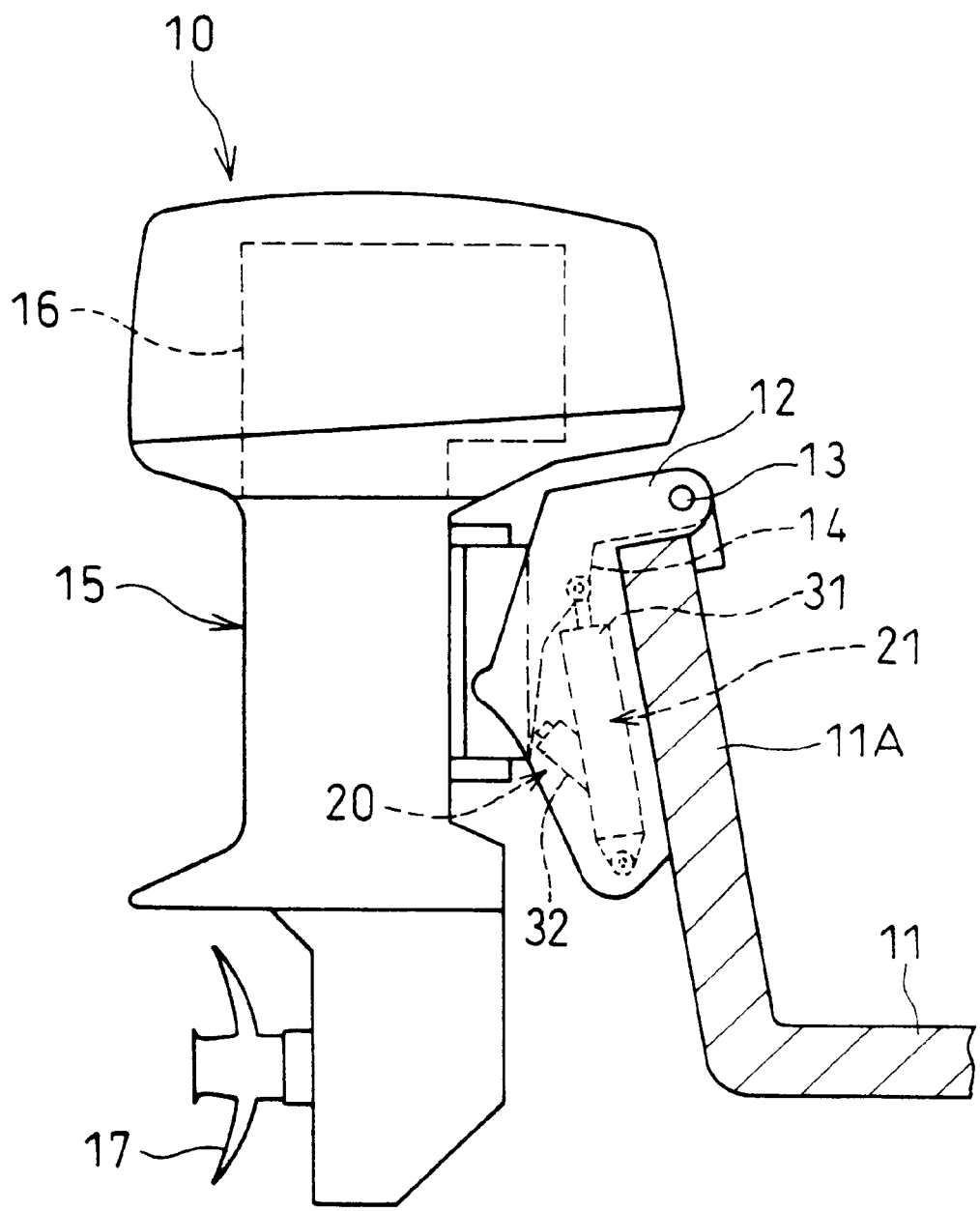
FIG. 1 is a schematic view of a marine propulsion unit.

A marine propulsion unit 10 (it may be outboard motor or inboard motor) is provided with a stern bracket 12 secured to a stern plate 11A of a boat body 11. A swivel bracket 14 is pivotally connected to the stern bracket 12 through a tilt shaft 13 such that the swivel bracket 14 can tilt around a substantially horizontal axis shown in FIG. 1. A propelling unit 15 is pivotally connected to a swivel bracket 14 through a steering shaft, not shown, is substantially vertically disposed such that the propelling unit 15 can be turned around the steering shaft. An engine unit 16 is mounted in an upper portion of the propelling unit 15, and the propelling unit 15 is provided at its lower portion with a propeller 17.

The propelling unit 15 of the marine propulsion unit 10 is pivotally supported on the stern bracket 12 secured to the boat body 11 through the tilt shaft 13 and the swivel bracket 14. A cylinder device 21 of the tilt-trim device 20 is interposed between the stern bracket 12 and the swivel bracket 14. A hydraulic fluid is selectively supplied or discharged from or into a hydraulic fluid supply/discharge device 22 into or from the cylinder device 21, thereby expanding or contracting the cylinder device 21 so that the propelling unit 15 can be tilted. (cylinder device 21)(FIGS. 2, 3 and 7)

Figure 3:
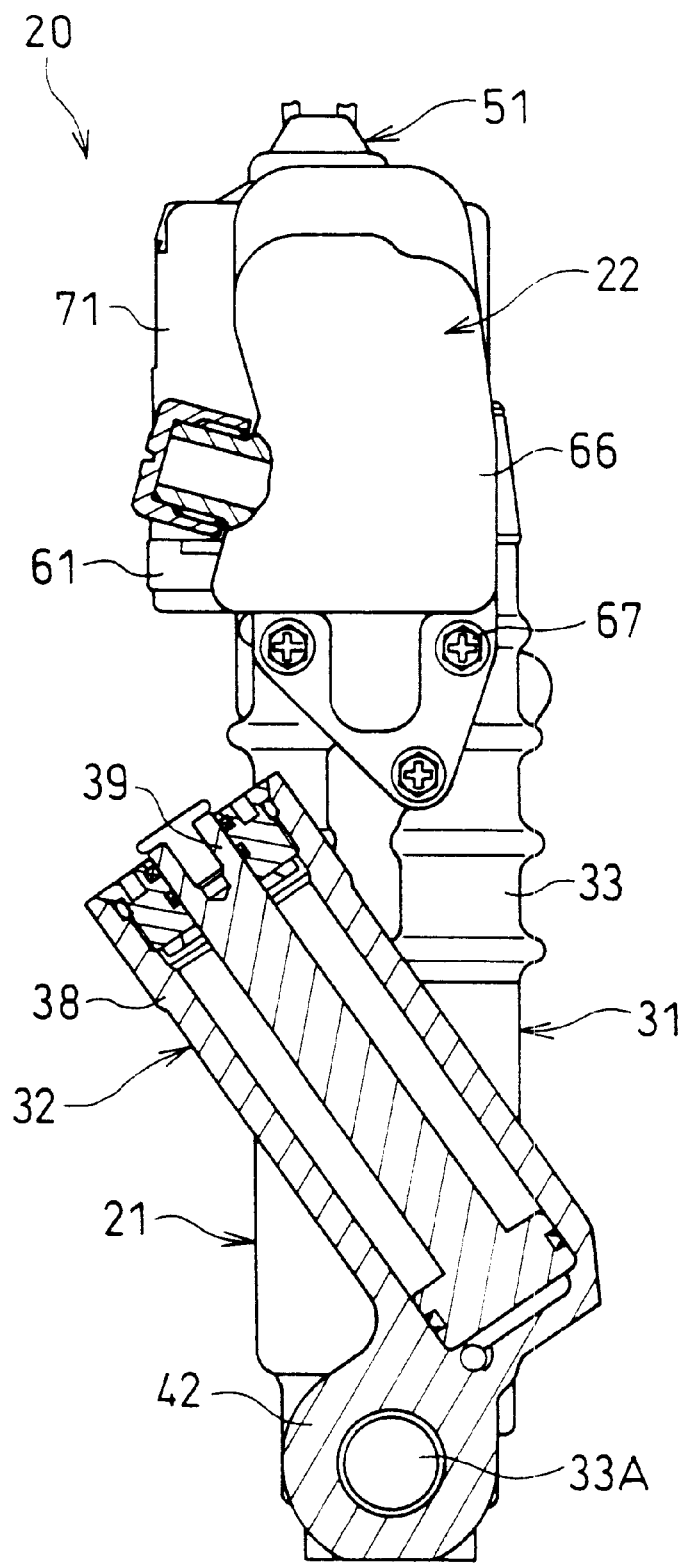
FIG. 3 is a partial fractured sectional view of FIG. 2.

As shown in FIGS. 2 and 3, a cylinder device 21 of a tilt-trim device 20 includes a tilt cylinder 31 at a center portion and a pair of right and left trim cylinders 32.

As shown in FIGS. 2, 3, and 7, the tilt cylinder 31 includes a cylinder 33 and a piston rod 34. The cylinder 33 includes a mounting pin inserting hole 33A for a stern bracket 12. The piston rod 34 includes a mounting pin inserting hole 34A for a swivel bracket 14. The tilt cylinder 31 is divided into an upper chamber 36A which accommodates the piston rod 34 and a lower chamber 36B which does not accommodate the piston rod 34 by a piston 35 secured to the end of the piston rod 34. The tilt cylinder 31 is provided with an impact absorption absorber valve 37 in the piston 35.

As shown in FIGS. 2, 3 and 7, the trim cylinders 32 includes a cylinder 38 and a piston rod 39 and the cylinder rod 39 is provided such that it can abut against the swivel bracket 14 to enable separation of the two. The trim cylinders 32 is divided into an upper chamber 41A which accommodates the piston rod 39 and a lower chamber 41B which does not accommodates the piston rod 39 by a piston 40 secured to the end of the piston rod 39.

The cylinder device 21 includes a cylinder 33 of the tilt cylinder 31 and a cylinder 38 of the trim cylinder 32, and these cylinders are integrated to a cylinder block 42 made of aluminum alloy casting.

(hydraulic fluid supply/discharge device 22)(FIGS. 2–7)

A hydraulic fluid supply/discharge device 22 includes a reversible motor 51, a reversible gear pump 52, a tank 53 and a flow passage 54 with a switching valve. According to the present embodiment, a tank housing 61 made of aluminum alloy casting composing the tank 53 is coupled to the one side of a cylinder block 42 by a bolt 62. The tank 53 comprising the tank housing 61 is used as well as a pump chamber 63. The pump 52, which is soaked in the pump chamber 63, is secured to the tank housing 61 by a bolt 64. An end plate 72 is secured to the tank housing 61 by a bolt 65 so that the upper opening of the pump chamber 63 is dosed by the end plate 72 of the motor 51, which will be described later. Further, a reservoir tank 66 is secured to the other side of the cylinder block 42 by a bolt 67. The pump 52, the tank 53 (66), the upper chamber 36A and the lower chamber 36B of the tilt cylinder 31 and the upper chamber 41A and the lower chamber 41B of the trim cylinder 32 are connected by flowing passage 54 with a switching valve. This is defined in the cylinder block 42 and the tank housing 61, as shown in FIG. 7.

Figure 4:
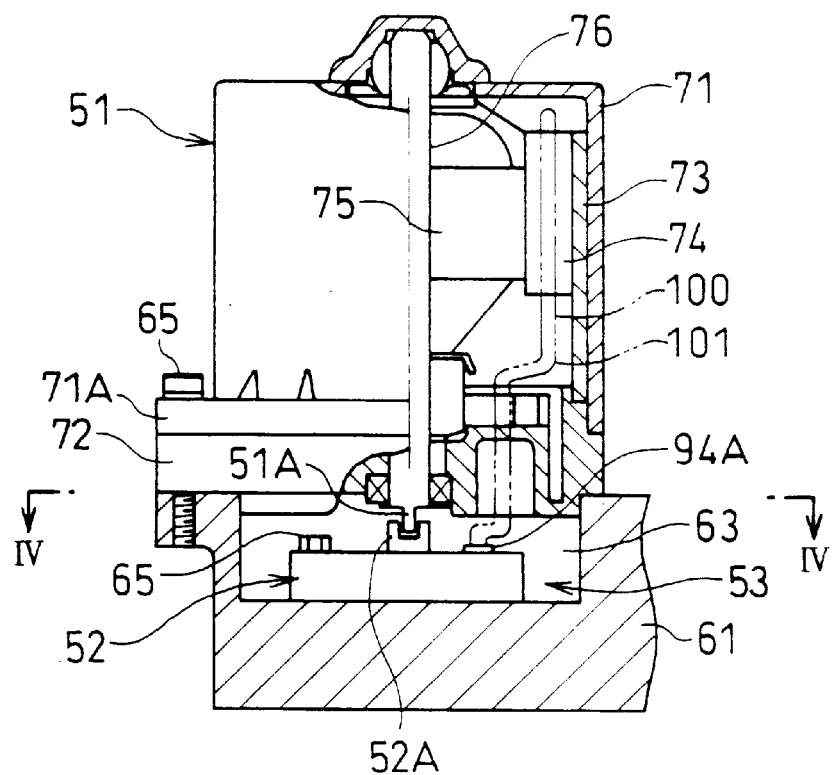
FIG. 4 is a sectional view of main parts of a hydraulic fluid supply/discharge device.
Figure 5:
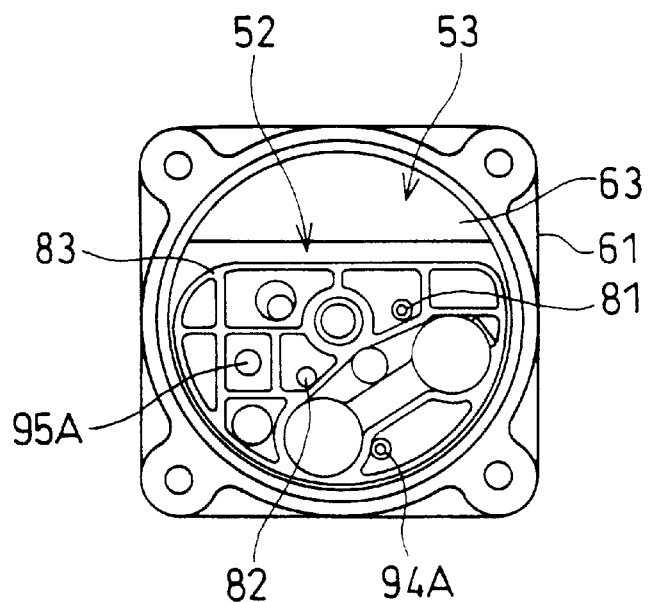
FIG. 5 is an end face view along a V—V line of FIG. 4.
Figure 6:
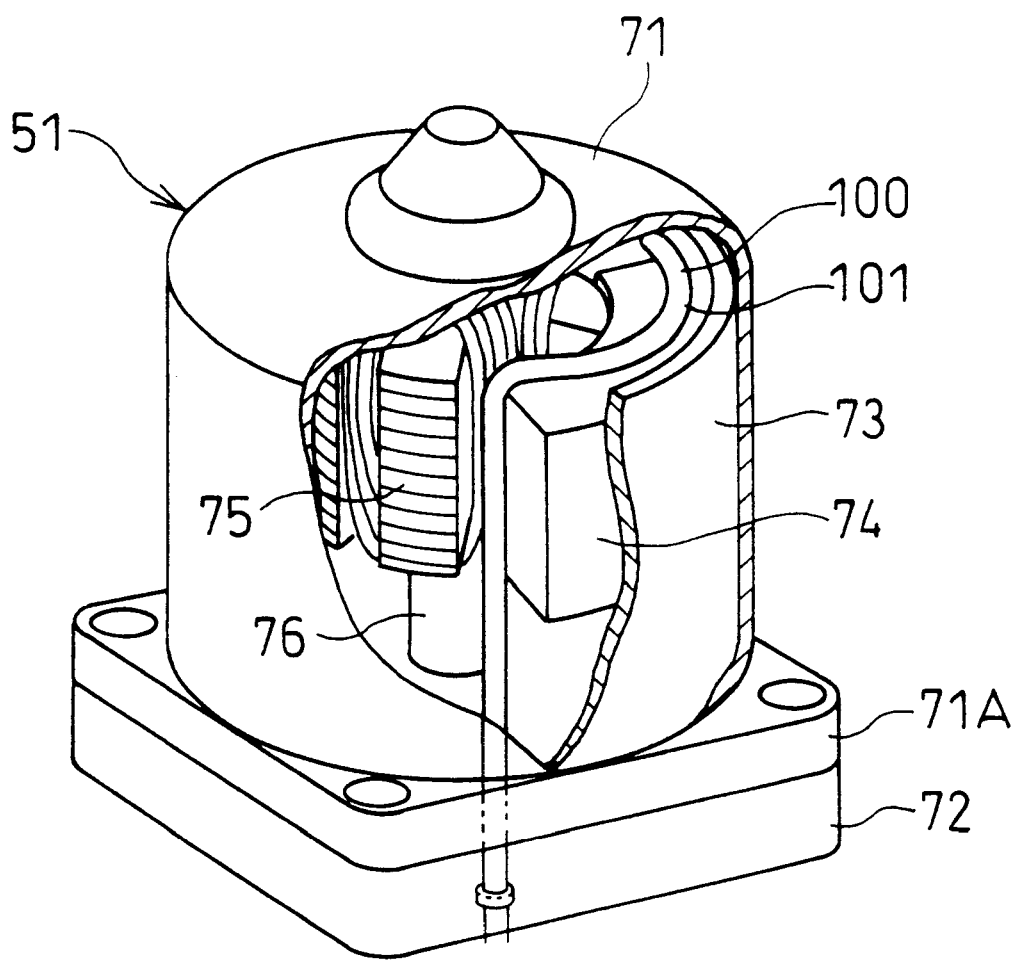
FIG. 6 is a partial fractured perspective view of a motor.

As shown in FIGS. 4 and 6, an outer hull of the motor 51 is composed of an armored case 71 with a cylindrical ceiling and the end plate 72 for sealing a lower opening of the armored case 71. The armored case 71 is made of resin. The motor 51 includes a cylindrical iron yoke 73 in the inner circumference of the armored case 71 and a magnet 74 in the inner circumference of the iron yoke 73. As the magnet 74, two circular magnets 74, 74 are used. These magnets 74 correspond to respective half circumferences obtained from dividing the inner circumference of the iron yoke 73 in two in the circumferential direction. The motor 51 supports opposite ends of a rotor 76 including an armature 75, respectively, with respect to the ceiling of the armored case 71 and the end plate 72, respectively. A flange 71A of the armored case 71 and the end plate 72 are secured to the above-mentioned housing 61 in liquid tight manner by the bolt 65. Further, an output axis 51A of the motor 51 passes through the end plate 72 in liquid tight manner to be connected to a moved axis 52A of the pump 52 in the pump chamber 63 which is also used in the tank 53.

As described above, the pump 52 is arranged in the pump chamber 63(tank 53) composed of the tank housing 61 which is soaked therein. A tilt up absorption aperture 81 and a tilt down absorption aperture 82 are defined on the pump 52 which opens to the pump chamber 63(tank 53) via a filter 83. These apertures are capable of pressure sending a hydraulic fluid absorbed from the tank 53 to the flowing passage 54 with a switching valve under normal and reverse rotations of the motor 51.

As shown in FIG. 7, the flow passage 54 with a switching valve has a first oil passage 86 and a second oil passage 87 for communicating the pump 52 to the upper chamber 36A and the lower chamber 36B of the tilt cylinder 31, respectively. The flow passage 54 with a switching valve allows a middle part of a second oil passage 87 to communicate to the lower chamber 41B of the trim cylinder 32. Further, the upper chamber 41A of the trim cylinder 32 is communicated to the tank 53 via the filter 83. In this state, the flowing passage 54 with a switching valve includes a shuttle type switch valve 91, non-return valves 92 and 93, a down blow valve 94, an up blow valve 95, a manual valve 96, a non-return valve 97 and a thermal blow valve 98.

The shuttle type switch valve 91 includes a spool with a first check mechanism 111A, a first non-return valve 112A and a second non-return valve 112B which are located on the opposite sides of the spool with the second check mechanism 111B. The spool 111A and the spool 111B are connected via a flow passage 113. On the normal rotation of the pump 52, an oil feeding pressure opens the first non-return valve 112A and a oil feeding pressure through the check mechanism of the spool with the first check mechanism 111A. It moves the spool with the second check mechanism 111B so that the second non-return valve 112B at the opposite side is opened and operated. Further, on the reverse rotation of the pump 52, an oil feeding pressure opens and operates the second non-return valve 112B and a oil feeding pressure through the check mechanism of the spool with the second check mechanism 111B. It moves the spool with the first check mechanism 111A so that the first non-return valve 112A at the opposite side is also opened and operated.

The non-return valve 92 is interposed between the pump 52 and the tank 53. On the tilt up operation of the cylinder device 21, the inner volume of the cylinders 33 and 38 increases by retreat of the piston rods 34 and 39, so that the circulating quantity of the hydraulic fluid runs short. The non-return valve 92 is opened to compensate the shortage of the circulating quantity of the hydraulic fluid from the tank 53 to the pump 52.

The non-return valve 93 is interposed between the pump 52 and the tank 53. When the tilt down from the cylinder device 21 is completed, the non-return valve 93 completes its tilt down. Even when the lower chambers 36B and 41B exhaust the hydraulic fluid to be returned to the pump 52, in the operation of the pump 52, the hydraulic fluid can be supplied from the tank 53 to the pump 52 by the opening operation of the non-return valve 93.

The down blow valve 94 is composed of an orifice. On the tilt down operation of the cylinder device 21, the inner volume of the cylinders 33 and 38 decreases by ingress of the piston rods 34 and 39 to generate the excess circulation volume of the hydraulic fluid, so that the excess hydraulic fluid is returned from a discharging orifice 94A to the tank 53. Further, the discharging opening 94A of the down blow valve 94 is defined on the upper surface of the pump 52 in the inside of the pump chamber 63(tank 53).

The up blow valve 95 returns the excess hydraulic fluid from the discharging orifice 95A to the tank 53. This happens if the pump 52 is operating even when the tilt cylinder 31 is completely extended and the tilt up is brought to completion on the tilt up operation of the cylinder device 21.

Further, the discharging orifice 95A of the up blow valve 95 is defined on the upper surface of the pump 52 in the inside of the pump 63(tank 53).

The manual valve 96 is operated by hand upon troubles of the tilt-trim device 20 and it returns the hydraulic fluid of the lower chambers 36B and 41B of the cylinder 21 to the tank 53. Accordingly, the manual valve 96 constricts the cylinder device 21 manually together with the operation of the non-return valve 97 and it is capable of the manual tilt down operation of the propulsion unit 15.

The non-return valve 97 is capable of drawing the hydraulic fluid of the tank 53 into the upper chamber 36A of the cylinder device 21 upon using the manual valve 96 and it contributes to the manual contraction of the cylinder device 21.

The thermal blow valve 98 carries out a function of thermal blow to release to the tank 53 the increased hydraulic fluid when the volume of the hydraulic fluid of the lower chambers 36B and 41B and the second oil passage 87 of the cylinder device 21 is increased by temperature change.

The explanation of the basic operations of the tilt-trim device 20 is given below.

(1) tilt up

If the motor 51 and the pump 52 are reversely rotated, the hydraulic fluid of the pump 52 opens and operates the second check valve 112B of the shuttle type switch valve 91 and opens and operates the first non-return valve 112A via the spool 111A and the spool 111B. Thus, the discharge hydraulic fluid of the pump 52 is supplied to the lower chamber 36B of the tilt cylinder 31 through the second non-return valve 112B and the second oil passage 87. The hydraulic fluid of the upper chamber 36A returns to the pump 52 through the first oil passage 86 and the first non-return valve 112A, so that it extends the tilt cylinder 31 to tilt up it.

In conjunction with the tilt up operation of the tilt cylinder 31, the hydraulic fluid supplied to the second oil passage 87 is supplied to the lower chamber 41B of the trim cylinder 32 to trim up the trim cylinder 32. Further, the hydraulic fluid of the upper chamber 41A of the trim cylinder 32 returns to the tank 53.

According to the above described up-operations of the tilt cylinder 31 and the trim cylinder 32, after the propulsion unit 15 reaches the maximum trim up position, only the piston rod 34 of the tilt cylinder 31 elongates at a faster rate. Therefore, the propulsion unit 15 is tilted up to the maximum tilt up position.

Further, a throttle 86A is provided on the first oil passage 86 to synchronize the up-operation of the tilt cylinder 31 and the trim cylinder 32.

(2) tilt down

In normal rotation of the motor 51 and the pump 52, the discharged hydraulic fluid of the pump 52 opens and operates the first non-return valve 112A of the shuttle type switch valve 91. It also opens and operates the second non-return valve 112B via the spool 111A and the spool 111B. Thus, the discharged hydraulic fluid of the pump 52 is supplied to the upper chamber 36A of the cylinder device 21 through the first non-return valve 112A and the first oil passage 86. The hydraulic fluid of the lower 36B of the cylinder device 21 returns to the pump 52 through the second oil passage 87 and the second non-return valve 112B to constrict and tilt down the tilt cylinder 31.

At an intermediate process of the tilt down operation of the tilt cylinder 31, after the swivel bracket 14 comes into contact with the piston rod 39 of the trim cylinders 32, the trim cylinder 32 is constricted to trim down.

However, according to the present embodiment, in order to prevent the heat accumulation in the motor 51, resin is applied to the armored case 71 of the motor 51. The hydraulic fluid to be circulated by the pump 52 comprises a cooling medium and a circulating passage 100 of this hydraulic fluid is mounted in the inside of the motor 51. Specifically, the circulating passage 100 is composed of a circulating pipe 101 comprising an aluminum pipe. The operation of the circulating passage 100 is explained as follows:

(1) One end of the circulating pipe 101 is connected to the discharging opening 94A of the down blow valve 94 (or the discharging orifice 95A of the up blow valve 95), which is defined on the upper surface of the pump 52 in the inside of the pump chamber 63 (tank 53).

(2) The circulating pipe 101 passes through the end plate 72 of the motor 51 in liquid tight manner. The middle portion between adjoining magnets 74 is raised up along the surface of the iron yoke 73 at the one side of the circumferential direction of the iron yoke 73. The raised portion is folded along the upper surface of the magnet 74. Then, the middle portion between adjoining magnets 74, 74 is thrown down along the surface of the iron yoke 73 at the other side of the circumferential direction of the iron yoke 73 to pass through the end plate 72 in liquid tight manner. As a result, the other end of the circulating pipe 101 is opened to the tank 53.

Further, the circulating pipe 101 is incorporated in the circulating passage 100 when forming the motor 51. The circulating pipe 101 is provided with a sealing member at the portion, which penetrates the end plate 72. Accordingly, upon formation of the hydraulic fluid supply/discharge device 22, the circulating pipe 101 may be configured such that the one protruding from the end plate 72 of the motor 51 is connected to the discharging opening 94A of the down blow valve 94 (or the discharging orifice 95A of the up blow valve 95) and the other end thereof is arranged in the pump chamber 63 (tank 53).

According to the present embodiment, the down blow valve 94 is intended to return the excess circulated hydraulic fluid to be pressurized and circulated by the pump 52 from the discharging opening 94A to the tank 53, as described above. Accordingly, on the tilt down operation of the cylinder device 21, the circulating pipe 101 connected to the discharging opening 94A puts the excess circulated hydraulic fluid volume through the inside of the motor 51 and cools down the inside of the motor 51. Further, when the circulating pipe 101 is connected to the discharging orifice 95A of the up blow valve 95, the circulating pipe 101 which is connected to the discharging orifice 95A puts the excess circulated hydraulic fluid through the inside of the motor 51 and cools down the motor 51. When the up blow valve 95 intends to return the excess circulated hydraulic fluid to be pressurized and circulated by the pump 52 from the discharging opening 95A to the tank 53, as described above, the cylinder device 21 is completely extended on the tilt up operation.

Therefore, the present invention has following effects.

(1) By arranging the circulating passage 100 (the circulating pipe 101) of the hydraulic fluid which is circulated by the pump 52 on the inside of the motor 51, it is possible to pass the hydraulic fluid as a cool medium in the circulating passage 100 on the inside of the motor 51. Therefore cooling the inside of the motor 51 without a loss of waterproof airtight structure of the motor 51 on the operation of the tilt-trim device 20.

(2) According to the explanation of (1), it is possible to prevent the inner heat accumulation and improve the durability and the life of the motor 51 by using a resin motor as the motor 51, which can obtain the cost reduction and the corrosive resistance. This effect can be prominent in the resin motor 51, which increases fever and has a great output.

(3) By placing the circulating pipe 101 which composing the circulating passage 100 through the inside of the motor 51 from the pump chamber 63 via the end plate 72 of the motor 51, which doses the pump chamber 63, it is possible to cool down the inside of the motor 51 with a simple construction without equipping pipe fittings of the circulating passage 100 in the pump chamber 63 and the outside of the motor 51.

(4) By connecting the circulating passage 100 (the circulating pipe 101) to the discharging opening 94A of the down blow valve 94 or the discharging opening 95A of the up blow valve 95 of the hydraulic fluid supply/discharge device 22, it is possible to cool down the inside of the motor 51 with a simple construction without having to change the hydraulic fluid supply/discharge device 22.

Further, in the hydraulic fluid supply/discharge device 22 of a marine propulsion unit 10, the flowing passage 54 with a switching valve is arranged in the cylinder block 42 and the tank housing 61 to connect the pump 52, the tank 53, the tilt cylinder 31 and the trim cylinder 32. The motor 51 is arranged at an upper part of the tank housing 61. Therefore, the hydraulic fluid flowing through the flowing passage 54 is cooled down sufficiently in the cylinder block 42 and the tank housing 61 made of aluminum alloy, which are located at a lower part to be easily in contact with sea water or the like. Therefore, the hydraulic fluid becomes suitable for a cooling medium. On the other hand, it is difficult for the motor 51 to be in contact with sea water or the like, since it is arranged at an upper part of the tank housing 61.

As heretofore explained, embodiments of the present invention have been described in detail with reference to the drawings. However, the specific configurations of the present invention are not limited to the embodiments but those having a modification of the design within the range of the present invention are also included in the present invention. For example, any circulating passage (the circulating pipe) in the inside of the motor may be employed and defined or embedded in the armored resin case. The circulating passage (the circulating pipe) may go around more than one round in the inside of the motor or may wind in zigzag.

Further, the circulating passage (the circulating pipe) may be coupled with other hydraulic pressure generating portion without being limited to the down blow valve and the up blow valve of the hydraulic fluid supply/discharge device.

In the tilt-trim device according to the present invention, the hydraulic fluid supply/discharge device may be formed in integrated with the cylinder block of the cylinder device. However, it is not always necessary for the hydraulic fluid supply/discharge device and the cylinder block to be formed integrally, they may be arranged separately.

As described above, according to the present invention, it is possible to prevent the inner heat accumulation of the resin motor composing a trim-tilt device for a marine propulsion unit and improve the durability and the life of the motor.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be embodied within a scope encompassed and equivalents thereof with respect to the features set out in the appended claims.

What is claimed is:

1. A tilt device for a marine propulsion unit comprising:
   a cylinder device interposed between a boat body and a marine propulsion unit, which is tiltably supported with respect to the boat body; and a hydraulic fluid supply/discharge device for extending and contracting the cylinder device and tilt operating said marine propulsion unit by controlling supply and discharge of the hydraulic fluid to the cylinder device;
   said hydraulic fluid supply/discharge device comprising a motor, a pump, a tank and a flowing passage with a switching valve;
   wherein an armored case of said motor is made of resin and a circulating passage of the hydraulic fluid to be circulated by said pump is arranged inside a yoke of said motor.

2. A tilt device for a marine propulsion unit comprising:
   a cylinder device interposed between a boat body and a marine propulsion unit, which is tiltably supported with respect to the boat body; and a hydraulic fluid supply/ discharge device for extending and contracting the cylinder device and tilt operating said marine propulsion unit by controlling supply and discharge of the hydraulic fluid to the cylinder device;
   said hydraulic fluid supply/discharge device comprising a motor, a pump, a tank and a flowing passage with a switching valve;
   wherein an armored case of said motor is made of resin and a circulating passage of the hydraulic fluid to be circulated by said pump is arranged in the inside of said motor; and
   said pump is arranged in a pump chamber to close an upper aperture of said pump chamber by an end plate of said motor and a circulating pipe composing said circulating passage disposed inside of said motor via said end plate of said motor.

3. A tilt device for a marine propulsion unit comprising:
   a cylinder device interposed between a boat body and a marine propulsion unit, which is tiltably supported with respect to the boat body; and a hydraulic fluid supply/ discharge device for extending and contracting the cylinder device and tilt operating said marine propulsion unit by controlling supply and discharge of the hydraulic fluid to the cylinder device;
   said hydraulic fluid supply/discharge device comprising a motor, a pump, a tank, a flowing passage with a switching valve;
   a down blow valve for returning to said tank the excess circulating hydraulic fluid volume to be circulated by said pump on the tilt down operation of said cylinder device; and
   an upper blow valve for returning to the tank the excess circulating hydraulic fluid volume to be circulated by said pump on the tilt up operation of said cylinder device;
   wherein an armored case of said motor is made of resin and a circulating passage of the hydraulic fluid to be circulated by said pump is arranged in the inside of said motor;
   said circulating passage is in communication with a discharging opening of said down blow valve or a discharging opening of said up blow valve.

4. A tilt device for a marine propulsion unit according to claim 2, said hydraulic fluid supply/discharge device comprising:
   a down blow valve for returning to said tank the excess circulating hydraulic fluid volume to be circulated by said pump on the tilt down operation of said cylinder device; and
   an upper blow valve for returning to the tank the excess circulating hydraulic fluid volume to be circulated by said pump on the tilt up operation of said cylinder device;
   wherein said circulating passage is in communication with a discharging opening of said down blow valve or a discharging opening of said up blow valve.

5. A tilt device for a marine propulsion unit according to claim 1, wherein said circulating passage comprises an aluminum circulating pipe.

6. A tilt device for a marine propulsion unit according to claim 2, wherein said circulating comprises an aluminum circulating pipe.

7. A tilt device for a marine propulsion unit according to claim 3, wherein said circulating passage comprises an aluminum circulating pipe.

8. A tilt device for a marine propulsion unit according to claim 4, wherein said circulating comprises an aluminum circulating pipe.

9. A tilt device for a marine propulsion unit according to claim 2, wherein said circulating pipe is provided with a sealing member in a member, which penetrates said end plate of said motor.

10. A tilt device for a marine propulsion unit according to claim 3, wherein said circulating pipe is provided with a sealing member in a member, which penetrates said end plate of said motor.

11. A tilt device for a marine propulsion unit according to claim 4, wherein said circulating pipe is provided with a sealing member in a member, which penetrates said end plate of said motor.

12. A tilt device for a marine propulsion unit according to claim 5, wherein said circulating pipe is provided with a sealing member in a member, which penetrates said end plate of said motor.

13. A tilt device for a marine propulsion unit according to claim 6, wherein said circulating pipe is provided with a sealing member in a member, which penetrates said end plate of said motor.

14. A tilt device for a marine propulsion unit according to claim 7, wherein said circulating pipe is provided with a sealing member in a member, which penetrates said end plate of said motor.

15. A tilt device for a marine propulsion unit according to claim 8, wherein said circulating pipe is provided with a sealing member in a member, which penetrates said end plate of said motor.

* * * * *